United States Patent [19]

Hayashi et al.

[11] Patent Number: 5,508,993
[45] Date of Patent: Apr. 16, 1996

[54] DIGITAL SIGNAL REPRODUCING APPARATUS USING A VITERBI DECODER

[75] Inventors: Hideki Hayashi; Hiroki Kuribayashi, both of Tsurugashima, Japan

[73] Assignee: Pioneer Electronic Corporation, Tokyo, Japan

[21] Appl. No.: 377,411

[22] Filed: Jan. 24, 1995

[30] Foreign Application Priority Data

Feb. 1, 1994 [JP] Japan .................................. 6-010504
Jan. 17, 1995 [JP] Japan .................................. 7-004739

[51] Int. Cl.⁶ ............................................... G11B 7/00
[52] U.S. Cl. ............................ 369/124; 369/54; 369/59; 369/32; 360/46; 360/51
[58] Field of Search ................................. 369/124, 126, 369/15, 48, 54, 59, 84; 360/46, 51, 48, 65, 77.08

[56] References Cited

U.S. PATENT DOCUMENTS 5,289,190  2/1994  Shimoda et al. ...................... 369/84
5,440,532  8/1995  Yokogawa et al. .................... 369/32
5,455,813  10/1995  Hayashi .................................. 369/59

*Primary Examiner*—Loha Ben
*Attorney, Agent, or Firm*—Sughrue, Mion, Zinn, Macpeak & Seas

[57] ABSTRACT

A digital signal reproducing apparatus using a Viterbi decoder, reproduces a digital signal without deteriorating the decoding performance even if a DC component is included in recorded data or the optical characteristics such as a reflection index or a refraction factor of an optical recording medium has altered. The digital signal reproducing apparatus converts read signals read from a recording medium to a digital sample value series by means of A/D conversion, extracts specified sample values from the sample value series to use an average of the specified sample values as an offset level, and uniformly adds a value corresponding to this offset level to each estimated sample value in a Viterbi decoder.

10 Claims, 21 Drawing Sheets

FIG.15

| OFFSET | ADDRESS | MEMORY DATA | | |
|---|---|---|---|---|
| − 0.3 | 0 | − 0.3 | 0.7 | 1.7 |
| − 0.2 | 1 | − 0.2 | 0.8 | 1.8 |
| − 0.1 | 2 | − 0.1 | 0.9 | 1.9 |
| 0.0 | 3 | 0 | 1 | 2 |
| 0.1 | 4 | 0.1 | 1.1 | 2.1 |
| 0.2 | 5 | 0.2 | 1.2 | 2.2 |
| 0.3 | 6 | 0.3 | 1.3 | 2.3 |

| A1 | A2 | A3 | B1 | B2 | B3 | |
|---|---|---|---|---|---|---|
| 1 | 0 | 0 | 1 | 1 | 0 | WHEN A FALLING EDGE IS DETECTED |
| 0 | 0 | 1 | 0 | 1 | 1 | WHEN A RISING EDGE IS DETECTED |

DIGITAL SIGNAL REPRODUCING APPARATUS USING A VITERBI DECODER

BACKGROUND OF THE INVENTION

1. Field of the Invention

The present invention relates to an apparatus for reproducing a digital signal recorded in a recording medium such as an optical disk, a magnetic disk, magnetic tape or the like.

2. Background of the Invention

Viterbi Algorithm is known as one of methods for decoding a digital signal recorded at a high density in a recording medium with high reliability. In the Viterbi Algorithm, a read signal read from the recording medium is not simply identified as a binary value of 1 or 0 according to a predetermined threshold value, but sample values obtained by sampling read signals are detected as a continuous time-series, and a probable data string is obtained based on this time-series.

A Viterbi decoder assumes state transition in a series of sample values successively supplied from an A/D convertor according to each estimated sample value stored in an estimated value memory (one of the status transitions is called branch, while continuous state transitions are called path), computes a branch-metric indicating probability of a branch as well as a path-metric indicating probability of a path, and decodes a probable data string according to the branch-metric and path-metric.

In the Viterbi decoder as described above, however, if the sample string has its values shifted uniformly, errors are generated in computing a branch-metric as well as a path-metric. Such a generation of error will result in deterioration of the decoding performance.

SUMMARY OF THE INVENTION

The present invention was made to solve the problem described above, and it is an object of the present invention to provide a digital reproducing apparatus which can reproduce digital signals without the decoding performance being deteriorated even in cases where a DC component is included in record data, or where optical characteristics of an optical recording medium such as a reflection factor or a refractive index change and offset is generated in a read signal.

A digital signal reproducing apparatus according to a first feature of the present invention is a digital signal reproducing apparatus which obtains digital signals by reproducing recorded information from read signals read from a recording medium in which digital signals are recorded, and comprises an A/D convertor which successively sample the read signals and converts the signals to a digital sample value series, a sample value extracting means for extracting specified sample values from the sample value series, an offset detecting means for obtaining an average value of the specified sample values and generating an offset signal according to the average value, a subtracting means for subtracting a value corresponding to the offset signal from each of the sample values in the sample value series and obtaining a result of subtraction as an offset-corrected sample value, and a decoding means for obtaining a reproduced digital value by executing decoding processing according to the offset-corrected sample value.

A digital signal reproducing apparatus according to a second feature of the present invention is a digital signal reproducing apparatus which obtains digital signals by reproducing recorded information from read signals read from a recording medium in which digital signals are recorded, and comprises an A/D convertor which successively sample the read signals and converts the signals to a digital sample value series, a sample value extracting means for extracting specified sample values from the sample value series, an offset detecting means for obtaining an average value of the specified sample values and generating an offset signal according to the average value, an estimated value memory for storing therein a plurality of estimated sample values provable as sample values in the sample value series, an adding means for uniformly adding the offset value to each of the estimated sample values and obtaining an offset correction estimated sample value, and a Viterbi recorder for decoding a data string providing a minimum accumulative sum of square error values each between each offset correction estimated sample value and each sample value in the sample value series as the reproduced digital signal.

The digital signal reproducing apparatus according to the first aspect of the present invention obtains corrected sample values subjected to offset correction by subjecting read signals read from a recording medium to A/D conversion to converts the signals to a digital sample string, extracting specified sample values from the sample value series, obtaining an average value of the sample values as an offset level, and uniformly subtracting this offset level from each of the sample values subjected to A/D conversion.

The digital signal reproducing apparatus according to the second feature of the present invention converts read signals read from a recording medium to a sample value series by subjecting the signals to A/D conversion, extracts specified sample values from the sample value series, obtained an average value of the specified sample values as an offset level, and supplies values obtained by uniformly adding this offset level to estimated sample values in a Viterbi recorder respectively as final estimated sample values to the Viterbi decoder.

BRIEF DESCRIPTION OF THE DRAWINGS

FIG. 15 is a diagram showing an example of a memory map in a estimated value memory 30';

DETAILED DESCRIPTION OF THE PREFERRED EMBODIMENTS

Prior to the explanation of embodiments of the present invention, description is made hereinafter for a conventional type of digital signal reproducing apparatus with reference to the related drawings.

Figure 1:
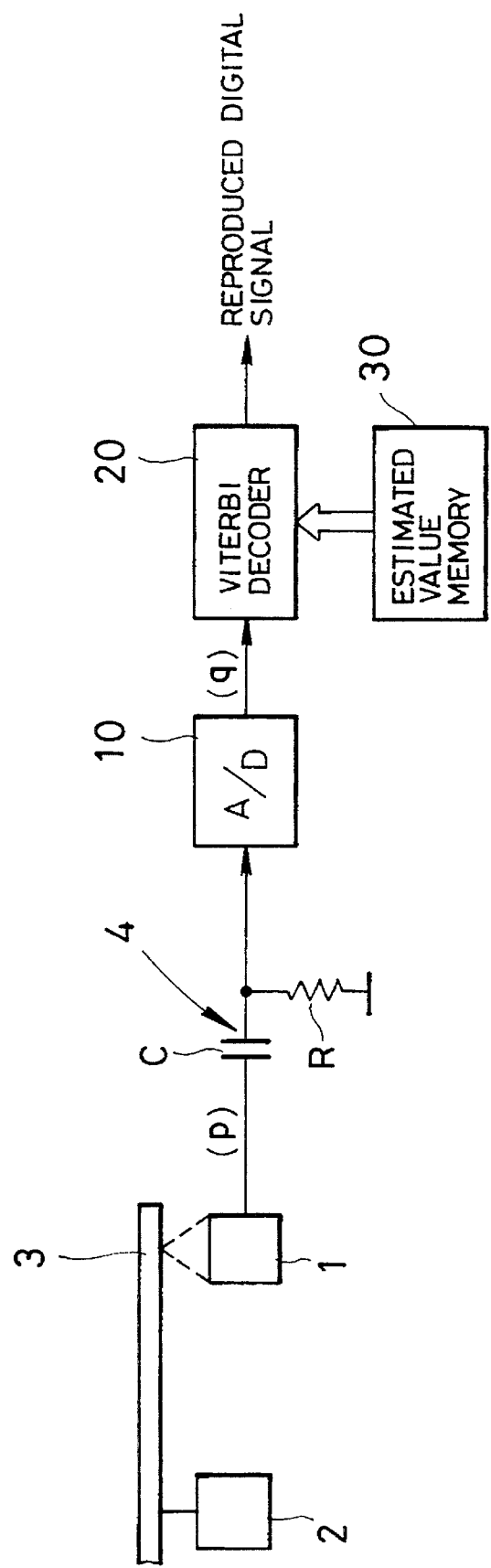
FIG. 1 is a diagram showing configuration of a conventional type of digital signal reproducing apparatus.

FIG. 1 is a view illustrating configuration of a digital signal reproducing apparatus which reproduces digital signals recorded at a high density in an optical disk as an optical recording medium by applying the Viterbi decoding as described above.

In this figure, an optical pick-up 1 irradiates a light beam to an optical disk 3 driven and rotated by a spindle motor 2. Furthermore the optical pick-up 1 obtains a read signal "p" by subjecting a reflected light from the optical disk 3 to photoelectric conversion and supplies the read signal "p" to a bias circuit 4 comprising a capacitor C and a resistor R. An example of the read signal "p" is shown by a solid line in FIG. 2. The bias circuit 4 removes a DC component in the read signal "p" supplied from the optical pick-up 1 and supplies the signal with DC component having been removed to an A/D convertor. The A/D convertor converts read signals supplied through the bias circuit 4 from the optical pick-up 1 at a specified sample timing to a digital sample value series "q" and supplied the signals to a Viterbi decoder 20. Previously stored in an estimated value memory 30 are a plurality of sample values as ideal values (values obtained when there is no effect by noise or the like) probable as sample values in the sample value series "q". The Viterbi decoder 20 assumes state transitions (one of the state transitions is called branch, and continuous state transition is called path), and computes a branch-metric indicating probability of the branch and a path-metric indicating probability of the path. The Viterbi decoder decodes a probable data string based on the branch-metric and path-metric.

Figure 3:
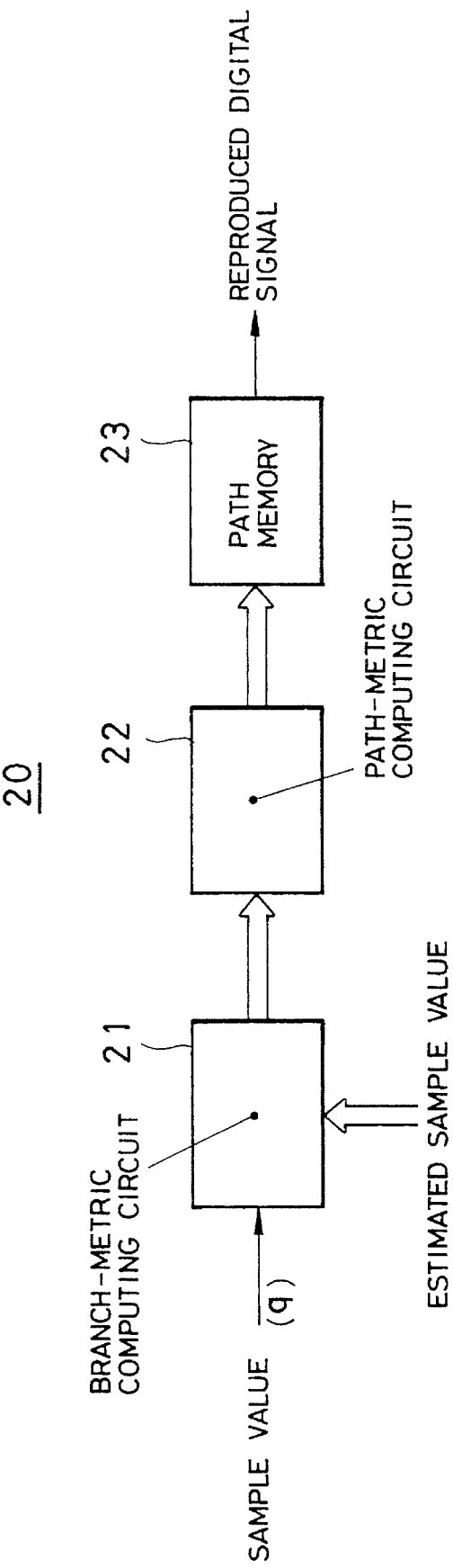
FIG. 3 is a diagram showing internal configuration of a Viterbi decoder 20.

FIG. 3 is a view illustrating internal configuration of the Viterbi decoder 20.

In this figure, a branch-metric computing circuit 21 obtains square errors each between each of a plurality of estimated sample values stored in the estimated value memory 30 and each sample value in the sample value series "q", namely $\{[\text{sample value series "q"}]-[\text{estimated sample value}]\}^2$ and supplies the square errors as branch-metric signals to a path-metric computing circuit 22. A path-metric computing circuit 22 obtains a path-metric by computing an accumulative sum of the branch-metric signals for each path, and supplies a path select signal indicating a path providing a minimum accumulative sum to a path memory 23. The path memory 23 updates data strings consisting of binary values of 0 and 1 according to the path select signal and successively outputs the data strings as reproduced digital signals.

Figure 4:
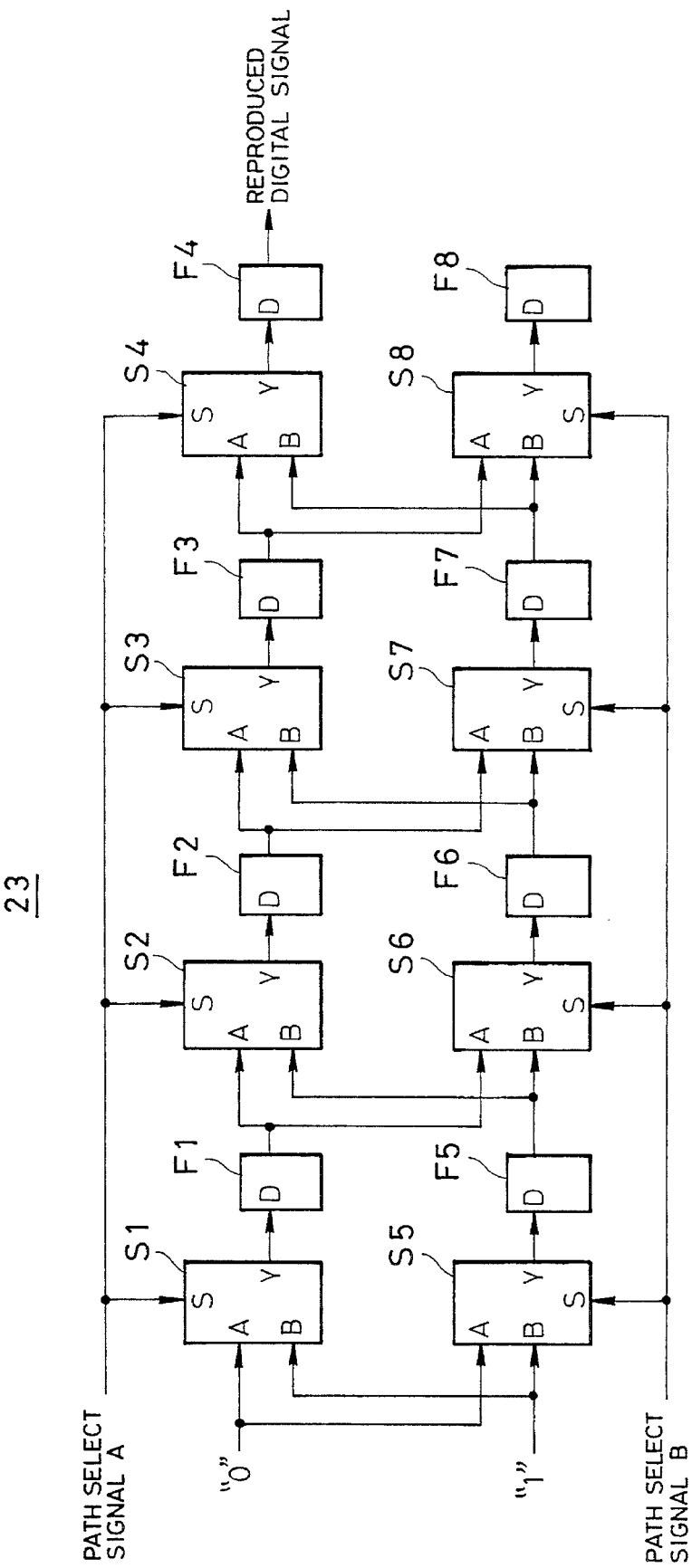
FIG. 4 is a diagram showing an example of internal configuration of a path memory 23.

FIG. 4 is a view illustrating an example of internal configuration of a path memory 23.

In this figure, if the path select signal A is logic "0", a register comprising flip-flops F1 to F4 shifts and outputs binary value digital signals stored in each of the flip-flops F1 to F4 successively from the flip-flop F4. In this step, the flip-flop F1 fetches signals indicating the logic "0" supplied thereto through a selector S1 and stores the signals therein. On the other hand, if the path select signal A is logic "1", a register comprising the flip-flops F2 to F4 fetches and stores binary value digital signals stored in each of flip-flops F5 through F7. In this step, the flip-flop F1 fetches and stores therein signals indicating logic "1" supplied thereto through the selector S1. If a path select signal B is logic "0", a register comprising flip-flops F6 to F8 fetches and stores therein binary value digital signals stored in each of the flip-flop F1 through F3. In this step, the flip-flop F5 fetches and stored therein signals indicating logic "0" supplied thereto through a selector S5. On the other hand, if the pas select signal B is logic "1", a register comprising the flip-flops F5 to F8 shifts binary value digital signals stored in each of the flip-flops F5 to F8. In this step, the flip-flop F5 fetches and stores therein signals indicating logic "1" supplied thereto through the selector S5. It should be noted that operations of the flip-flops F1 to F8 described above are executed once for a specified clock timing (not shown).

With the configuration as described above, data strings each comprising binary values of "0" and "1" are updated according to a path select signal and are successively outputted as reproduced digital signals.

It should be noted that, although a number of shift steps is based on 4-bit configuration in the sample shown in FIG. 4, actually a number of shift steps based on 20 to 200-bit configuration is often used.

As described above, the Viterbi decoder 20 computes a branch-metric and a path-metric according to each sample value in a sample value series "q" supplied from the A/D convertor 10 and each of a plurality of estimated sample values stored in the estimated value memory 30, and decodes a data string providing a minimum square errors among inputted data strings as a reproduced digital signal. Data decoding can be carried out at high reliability by executing Viterbi decoding as described above even in a case where S/N of a read signal "p" is low.

Figure 2:
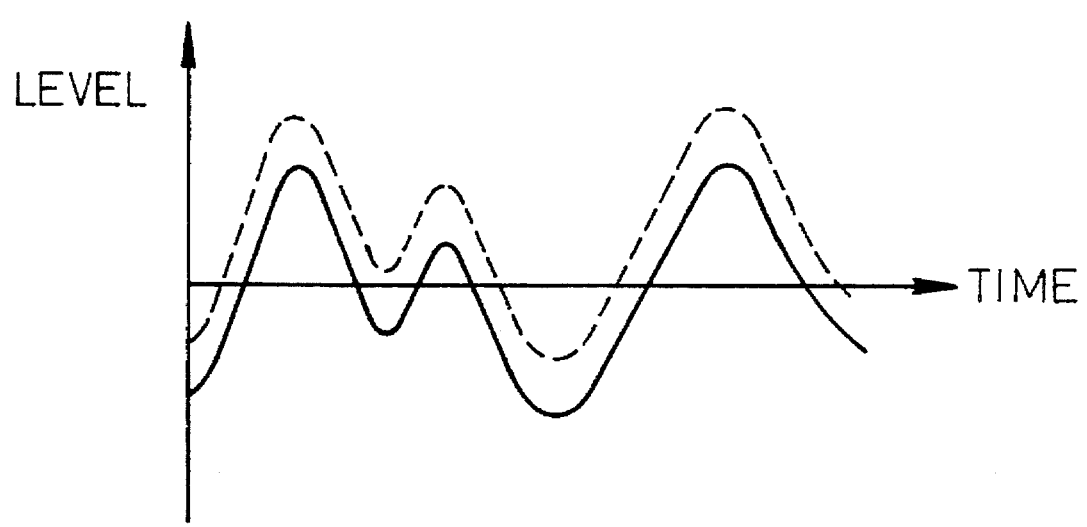
FIG. 2 is a diagram showing an example of a waveform of a read signal "p"

Herein, if a DC component is included in record data or characteristics such as a reflection factor or a refractive index of the optical disk 3 changes in the optical disk reproducing system as shown in FIG. 1, a waveform of the read signal "p" is offset as indicated by a dashed line in FIG. 2. In this step, values in the sample value series "q" itself obtained by the A/D convertor 10 are shifted by a value corresponding to the offset.

As described above, in the viterbi decoder 20 as described above, an error is generated in computing a branch-metric and a path-metric for a sample value series "q" in which values have been uniformly shifted as described above, which disadvantageously results in deterioration of the decoding performance.

Next description is made for the embodiments of the present invention.

Figure 5:
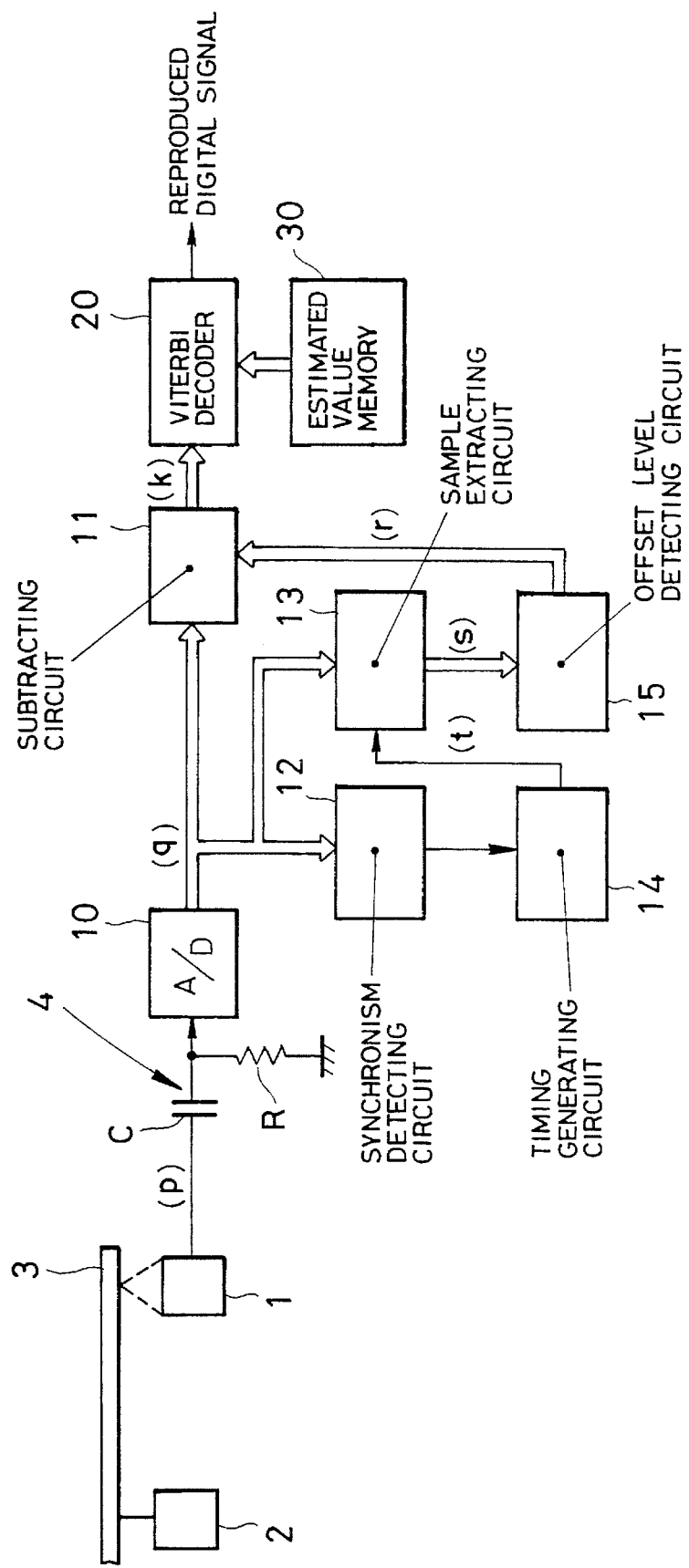
FIG. 5 is a diagram showing the configuration of a digital signal reproducing apparatus according to a first feature of the present invention.

FIG. 5 is a view illustrating configuration of the digital signal reproducing apparatus according to the first feature of the present invention.

Figure 6:
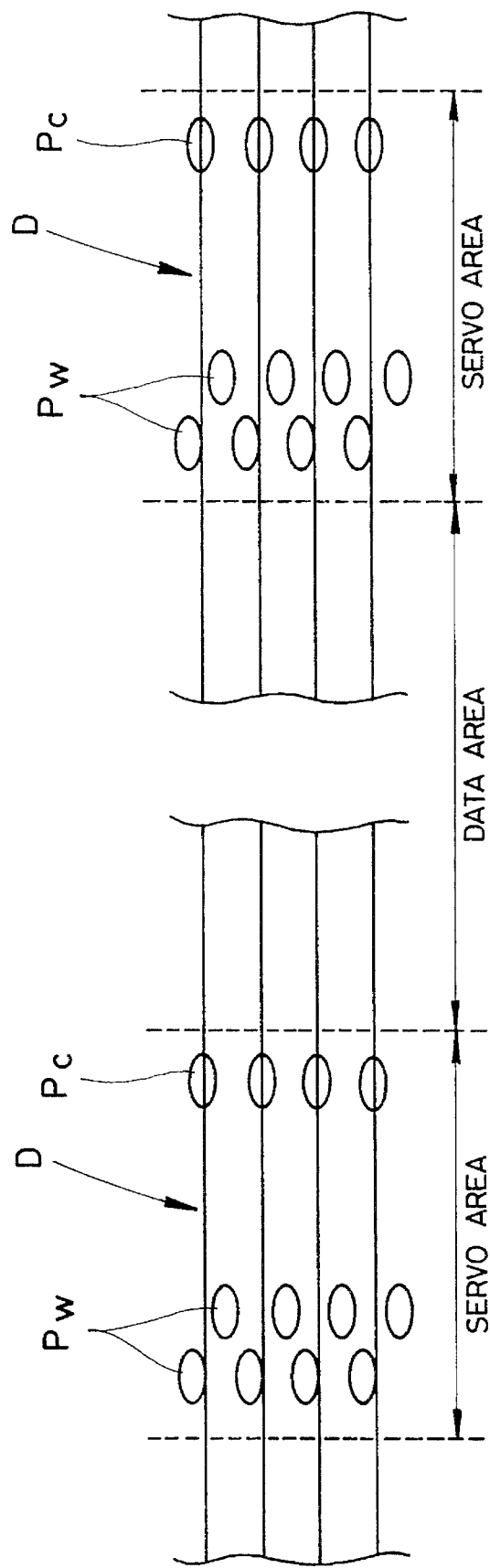
FIG. 6 is a diagram showing an example of configuration of an optical disk 3.

In this figure, the optical pick-up 1 irradiates a light beam to the optical disk 3 driven and rotated by the spindle motor 2. The optical disk 3 is a recording disk based on a sample servo system in which, for instance, servo areas and data areas are alternately and cyclically provided in the information reading direction. FIG. 6 shows an example of configuration of the optical disk 3 based on the sample servo system as described above.

As shown in this figure, in a servo area in the optical disk 3 are provided a wobble pit PW for tracking servo, a mirror surface section D for synchronism detection and focus servo, and a clock pit PC for reproduced clock phase detection formed for each recording track.

The optical pick-up 1 subjects a reflected light from the optical disk to photoelectric conversion to obtain a read signal "p", and supplies the signal to the bias circuit 4 comprising a capacitor C and a resistor R. The bias circuit 4 removes a DC component included in the read signal "p" supplied from the optical pick-up 1 and supplies the signal with the DC component having been removed to the A/D convertor 10. The A/D convertor 10 converts a read signal supplied through the bias circuit 4 from the optical pick-up 1 at a specified sample timing to a digital sample string "q" and supplies it to the subtracting circuit 11, synchronism detecting circuit 12, and sample value extracting circuit 13 respectively.

The synchronism detecting circuit 12 makes a determination as to whether sample value series "q" continuously supplied from the A/D convertor 10 correspond to the mirror surface section D for synchronism detection as shown in FIG. 6 or not, and supplies a detection signal to a timing generating circuit 14. At a point of time when the detection signal is supplied, the timing generating circuit 14 generates a timing signal "t" with a specified pulse width within a period of time for the optical pick-up 1 to trace the mirror surface section D, and supplies the signal to the sample value extracting circuit 13. The sample value extracting circuit 13 extracts sample values obtained during a period for generation of the timing signal "t" from the sample value series "q" continuously supplied from the A/D convertor 10, and supplies the sample values to an offset level detecting circuit 15 as offset sample values "s". The offset level detecting circuit 15 obtains an average value of the offset sample values "s", and supplies an offset signal "r" corresponding to the offset level to the subtracting circuit 11. The subtracting circuit 11 supplies a result of subtraction obtained by uniformly subtracting a value corresponding to the offset signal "r" from each value in the sample value series "q" as an offset-corrected sample value series "k" to the Viterbi decoder 20. Previously stored in the estimated value memory 30 are a plurality of estimated sample values as ideal values (values obtained when not affected by noise or the like) for sample values in the sample value series "q".

The Viterbi decoder 20 computes a branch-metric and a path-metric according to each of sample values in the offset-corrected sample value series "k" supplied from the subtracting circuit 11 as well as to each of a plurality of estimated sample values stored in the estimated value memory 30, and decodes a data string providing a minimum square error to an input string according to the branch-metric as well as the path-metric computed as described above. It should be noted that the Viterbi decoder 20 has the same configuration as that shown in FIG. 1 and for this reason detailed description thereof is omitted herein.

Figure 7:
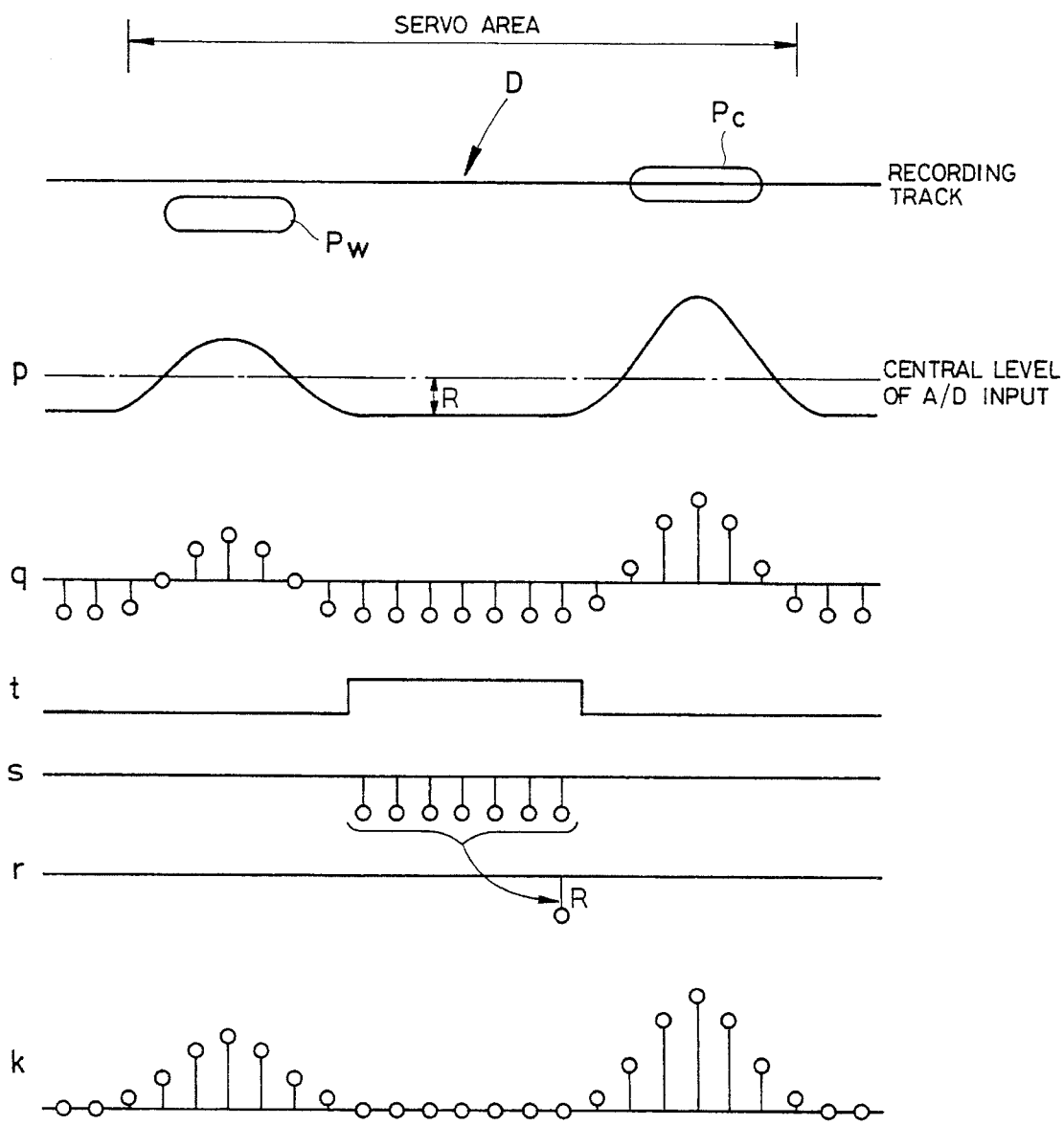
FIG. 7 is a diagram showing an operating waveform generated by the digital signal reproducing apparatus according to the first feature of the present invention.

FIG. 7 is a view illustrating an example of an operating waveform in the configuration as described above. This figure shows waveforms of internal signals obtained when the optical pick-up 1 traces a servo area of the optical disk 3 in a case where an offset at a level R is generated in the read signal "p". In this figure, signals having the same reference numerals as those used in FIG. 5 are the same signals as those in FIG. 5.

In this step, the sample value series "q" with sample values therein uniformly shifted by the level R is outputted, as shown in FIG. 7, from the A/D convertor 10. The synchronism detecting circuit 12 and timing generating circuit 14 estimates a period when the optical pick-up 1 is tracing the mirror surface section D according to the sample value series "q", and generates a timing signal "t" having a specified pulse width within this period. The sample value extracting circuit 13 extracts sample values obtained during the period for generation of the timing signal "t" as offset sample values "s" from the sample value series "q". The offset level detecting circuit 15 obtains an average value of the offset sample values "s". In this step, each of the sample values "s" corresponds to the level R described above, so that the average value obtained as described above corresponds to this level R. The offset level detecting circuit 15 supplies an offset signal "r" corresponding to the level R to the subtracting circuit 11. The subtracting circuit 11 subtracts a value corresponding to the level R above uniformly from each of the sample values in the sample value series "q" continuously supplied from the A/D convertor 10 to obtain offset-corrected sample value series "k" as shown in the figure.

As described above, with the configuration, the optical pick-up 1 detects an offset level according to a sample value series "q" obtained when tracing a mirror surface section D provided in a servo area of the optical disk 3 and uniformly subtract a value corresponding to the offset level from sample values in the sample value series "q" obtained as described above to obtain an offset-corrected sample value series "k" with a value corresponding to the offset level subtracted from the sample values therein.

Figure 8:
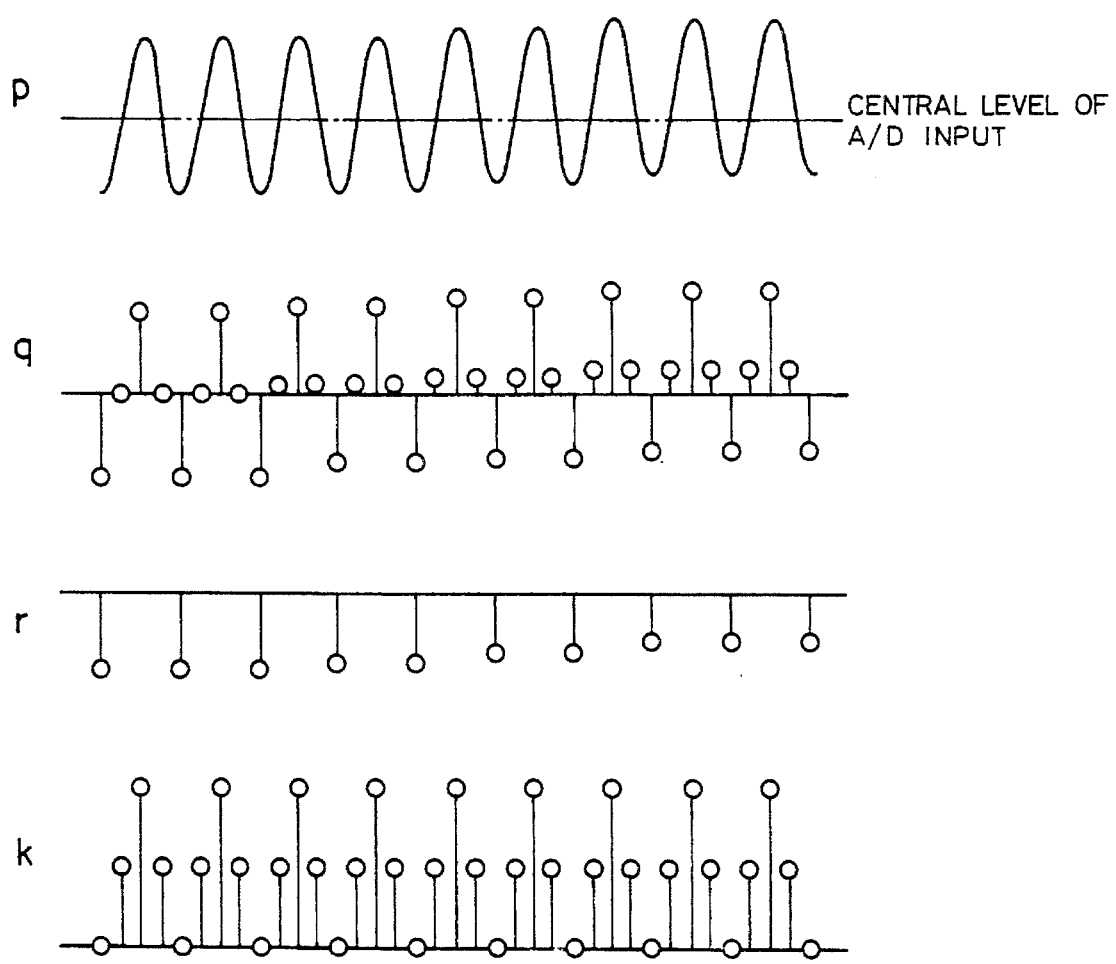
FIG. 8 is a diagram showing an operating waveform generated by the digital signal reproducing apparatus according to the first feature of the present invention.

Thus, even if an offset level generated in a read signal "p" changes as time goes by as shown in FIG. 8, it is possible to obtain an offset-corrected sample value series "k" with a value corresponding to the offset level removed from the sample values therein following the change, the Viterbi decoder can reproduce a digital signal without deteriorating the decoding performance.

It should be noted that, although an offset signal "r" is generated according to a sample value of the mirror surface D provided in a servo area of the optical disk 3 in the embodiment described above, the present invention is not limited to the configuration as described above.

For instance, the present invention may be embodied with the configuration in which a specified signal pattern (for instance, a signal pattern in which a single frequency is repeated) is previously recorded, and a timing signal "t" is generated at an information read cycle to the specified area by the synchronism detecting circuit 12 and the timing generating circuit 14 shown in FIG. 5.

Figure 9:
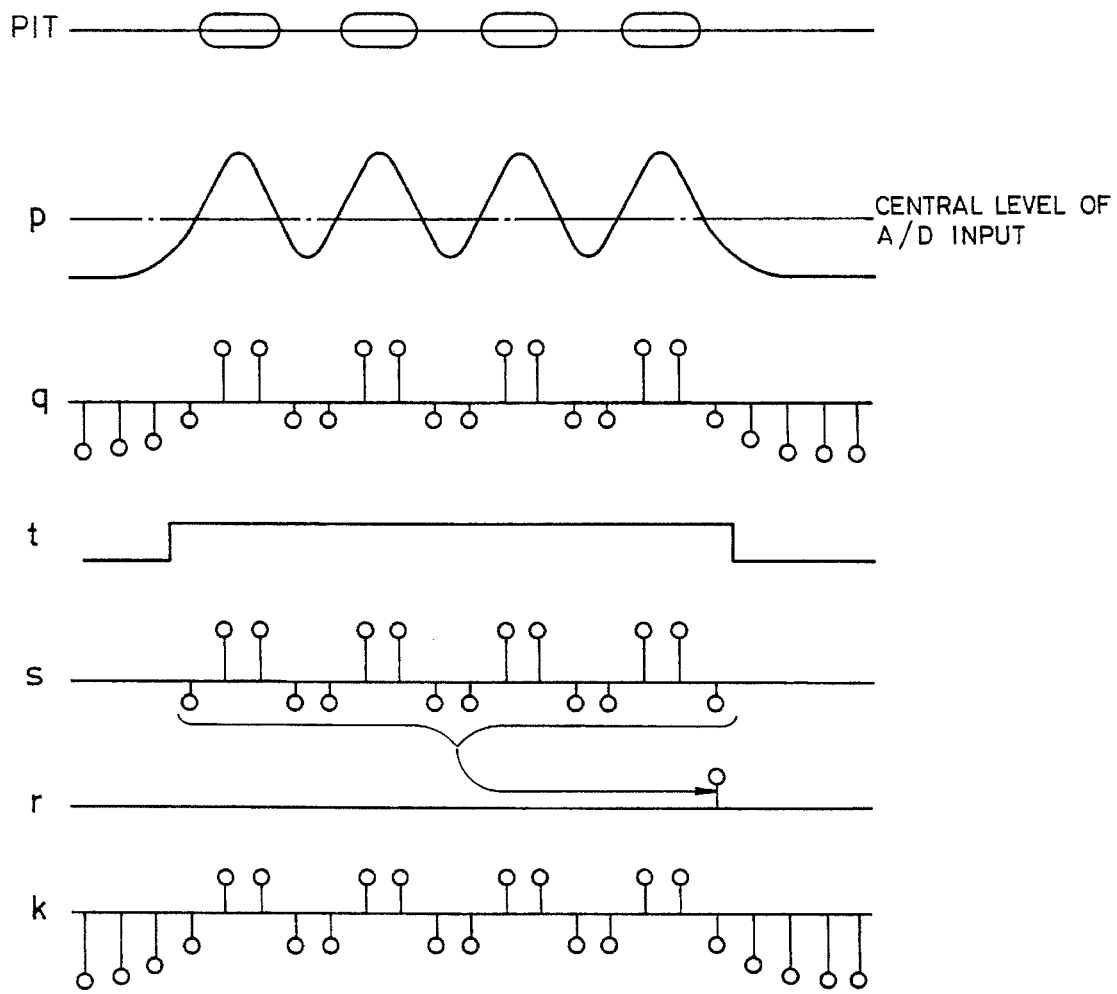
FIG. 9 is a diagram showing an operating waveform generated by a digital signal reproducing apparatus in another embodiment according to the first feature of the present invention.

FIG. 9 is a view illustrating an example of an operating waveform in the configuration.

As shown in this figure, the sample value extracting circuit 13 extracts sample values obtained during the period for generation of the timing signal "t", namely, sample values each corresponding to the specified signal pattern as offset sample values "s" from the sample value series "q".

If it is assumed that a record reproducing system for digital signals as described above is a partial response system, a range of a value probable in the sample value series "q" obtained by the A/D convertor 10 is limited. Herein, if a PR (1,1) system is applied as the partial response system, values idealistically probable as a sample value series "q" are, for instances, 3 values of {0,1,2}.

For this reason, a configuration can be adopted in which a determination is made as to which of the 3 values of {0,1,2} the sample value series "q" is close to by comparing a level of each sample value in a sample value series "q" actually obtained to, for instance, to two threshold values of 0.5 and 1.5 and only sample values corresponding to one of the levels are extracted as offset sample values "s".

Figure 10:
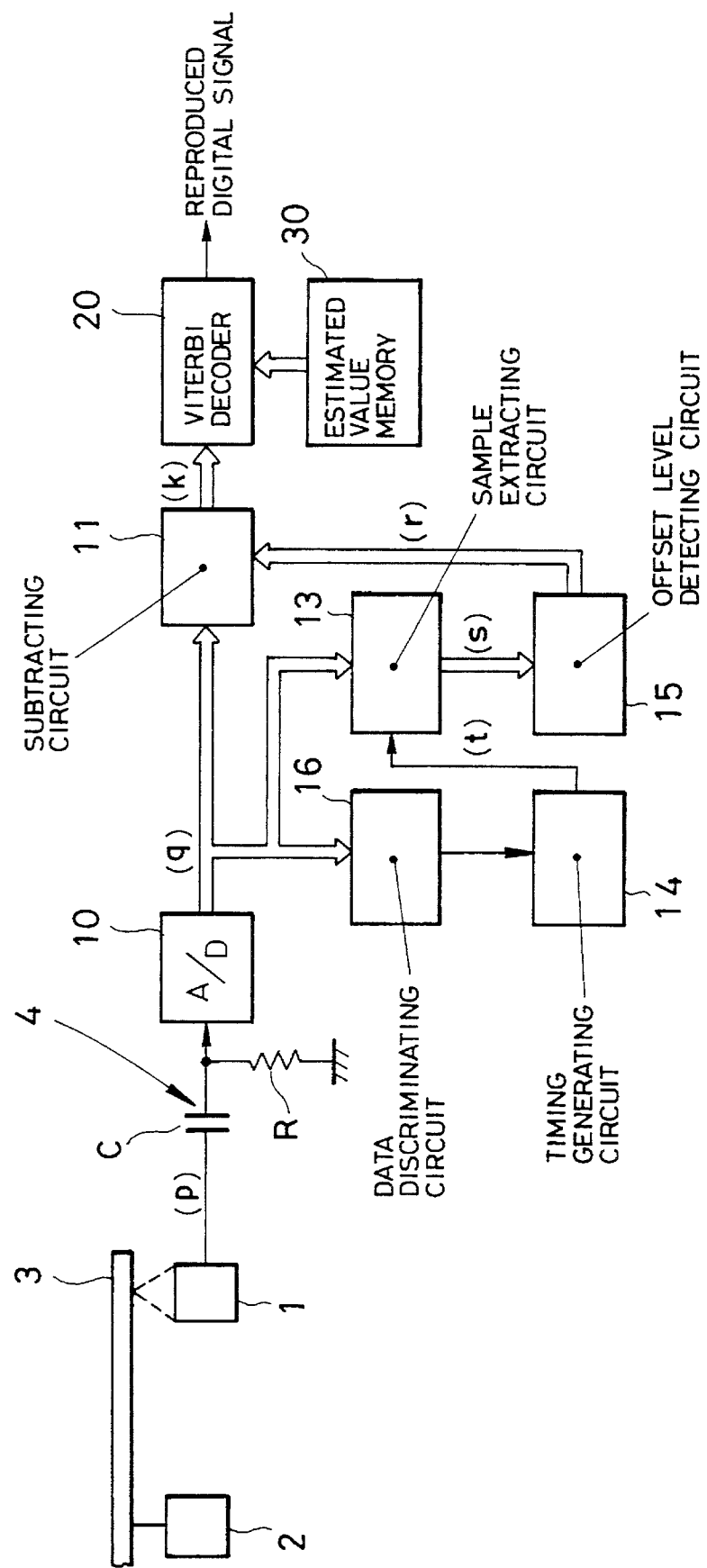
FIG. 10 is a diagram showing an operating waveform generated by a digital signal reproducing apparatus in another embodiment according to the first feature of the present invention.
Figure 11:
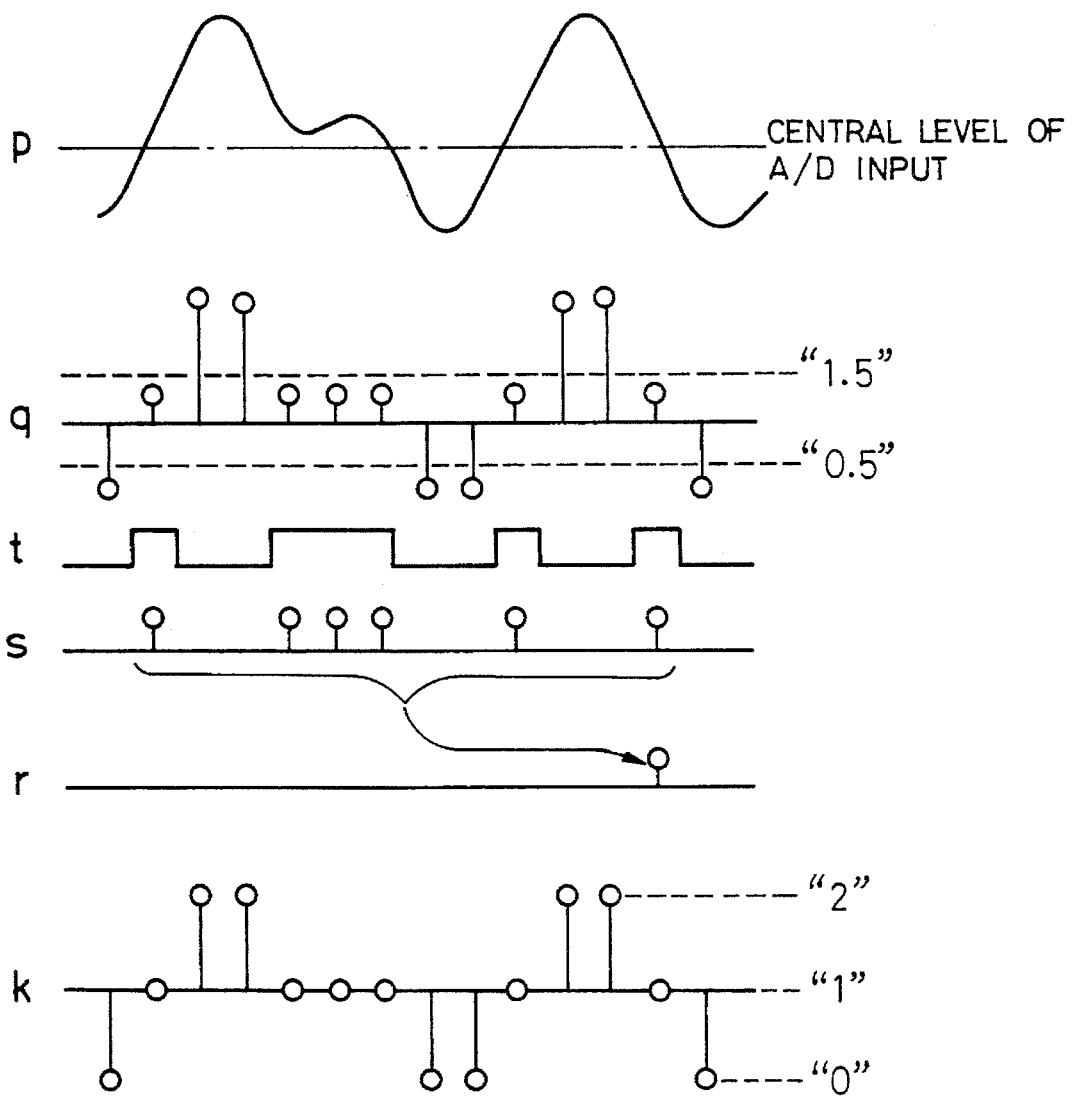
FIG. 11 is a diagram showing an operating waveform generated by a digital signal reproducing apparatus in another embodiment according to the first feature of the present invention.

FIG. 10 is a view illustrating an example of a digital signal reproducing apparatus having the configuration as described above, while FIG. 11 is a view illustrating an example of an operating waveform in the configuration.

It should be noted that, in this figure, the same reference numerals are assigned to the same functional modules as those in FIG. 5. In the configuration, a data discriminating circuit 16 makes a determination as to whether a value of the sample value series "q" obtained by the A/D convertor 10 is equal to or more than 0.5 and less than 1.5 or not, and if it is determined that the value is equal to or more than 0.5 and less than 1.5, the data discriminating circuit 16 generates a data discrimination signal and supplies the signal to the timing generating circuit 14. The timing generating circuit 14 generates a timing signal "t" having a specified pulse width according to the data discrimination signal, and supplies the signal to the sample value extracting circuit 13. The sample value extracting circuit 13 extracts sample values obtained during the period for generation of the timing signal "t" from the sample value series "q" continuously supplied from the A/D convertor 10, and supplies the sample values as offset sample values "s" to the offset level detecting circuit 15. The offset level detecting circuit 15 detects an average value of the offset sample values as an offset level, and supplies an offset signal "r" corresponding to this offset level to the subtracting circuit 11. The subtracting circuit 11 subtracts a value corresponding to the offset signal "r" uniformly from values in the sample value series "q" and supplies a result of subtraction as an offset-corrected sample value series "k" to the Viterbi decoder 20.

In brief, specified samples are extracted from the sample value series "q" subjected to A/D conversion, an average value of the specified sample values thus extracted is computed as an offset value, and values obtained by uniformly subtracting a value corresponding to the offset level from each sample value in the sample value series "q" may be used as an offset-corrected sample value series "k".

Description of the above embodiment was made assuming the configuration in which the offset-corrected sample value series "k" subjected to offset correction is obtained by subtracting a value corresponding to the offset signal "r" from sample values in the sample value series "q" with the subtracting circuit 11, but next description is made for configuration in which offset correction is executed without using the subtracting circuit 11.

Figure 12:
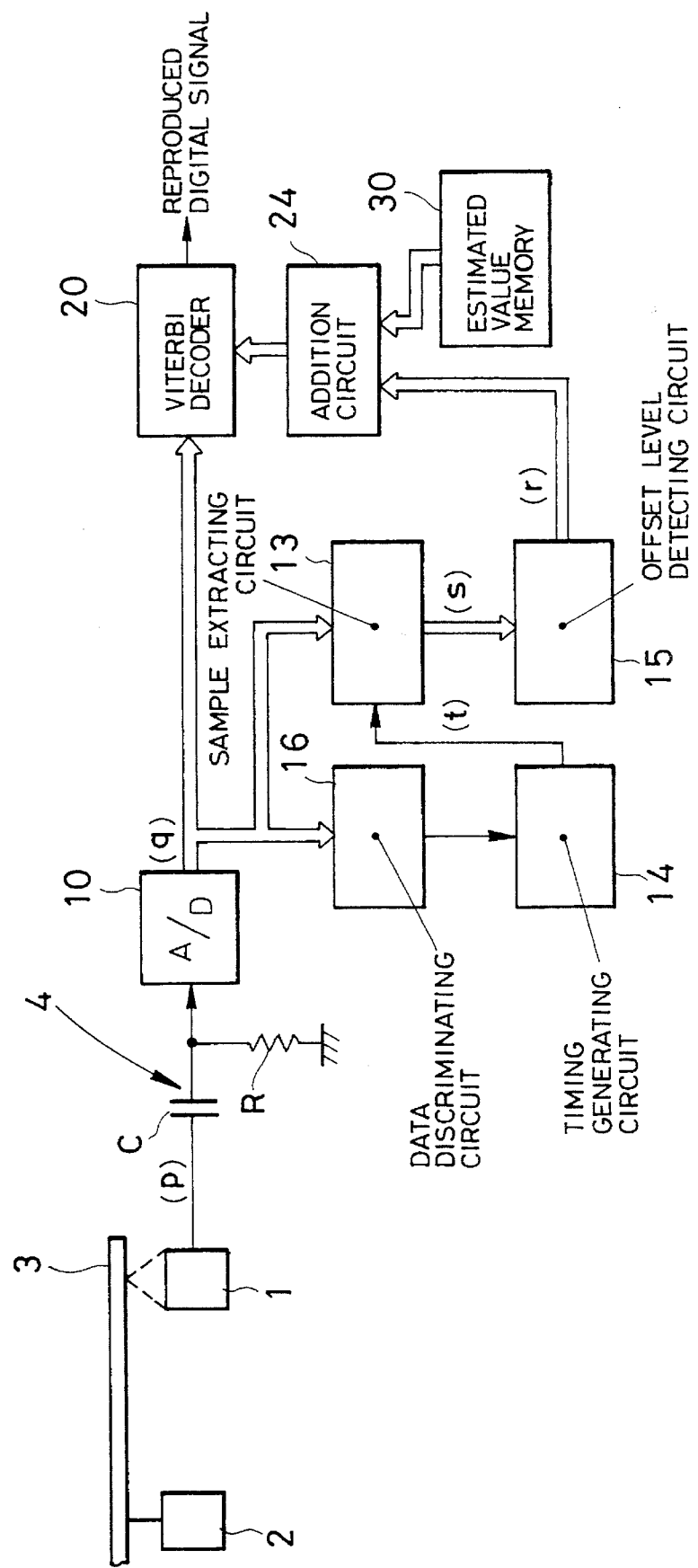
FIG. 12 is a diagram showing configuration of a digital signal reproducing apparatus according to a second feature of the present invention.

FIG. 12 is a view illustrating configuration of a digital signal reproducing apparatus according to the second feature of the present invention made based on the circumstances as described above.

FIG. 12 shows an example of configuration of a digital signal reproducing apparatus applied in a case where a record reproducing system for digital signals as described above is a PR (1,1) partial response system.

In this figure, the optical pick-up 1 irradiates a light beam onto the optical disk 3 driven and rotated by the spindle motor 2. Furthermore, the optical pick-up 1 obtains a read signal "p" by subjecting a reflected light from the optical disk 3 to photoelectric conversion, and supplies the read signal "p" to the bias circuit comprising a capacitor C and a resistor R. The bias circuit 4 removes a DC component included in the read signal "p" supplied from the optical pick-up 1, and supplies the signal with the DC component having been removed to the A/D convertor 10. The A/D convertor converts the read signal supplied through the bias circuit 4 from the optical pick-up 1 at a specified sample timing to a sample value series "q", and supplies it to the data discriminating circuit 16, sample value extracting circuit 13, and Viterbi decoder 20 respectively.

The data discriminating circuit 16 makes a determination as to whether a value of the sample value series "q" obtained by the A/D convertor 10 is equal to or larger than 0.5 and simultaneously less than 1.5 or not, and if it is determined that the value is equal to or larger than 0.5 and simultaneously less than 1.5, the data discriminating circuit 16 generates a date discrimination signal and supplies the signal to the timing generating circuit 14. The timing generating circuit 14 generates a timing signal "t" having a specified pulse width according to the data discriminating signal and supplies the signal to the sample value extracting circuit 13. The sample value extracting circuit 13 extracts sample values obtained during a period for generation of the timing signal "t" above from the sample value series "q" continuously supplied from the A/D convertor, and supplies the values as offset sample values "s" to the offset level detecting circuit 15. The offset level detecting circuit 15 detects an average value of the offset sample values "s" as an offset level and supplies an offset signal "r" corresponding to the offset level to the addition circuit 24. Previously in the estimated value memory 30 are stored a plurality of estimated sample values as ideal values probable as sample values in the ample value string "q" (values obtained when not affected by noise or the like), and the estimated sample values are supplied to the addition circuit 24 respectively. The addition circuit 24 obtains offset-corrected estimated sample values obtained by uniformly adding all the estimated sample values stored in the estimated value memory 30, and supplies the offset-corrected estimated sample values to the Viterbi decoder. It should be noted that the Viterbi decoder 20 has the same configuration as that shown in FIG. 3.

Figure 13:
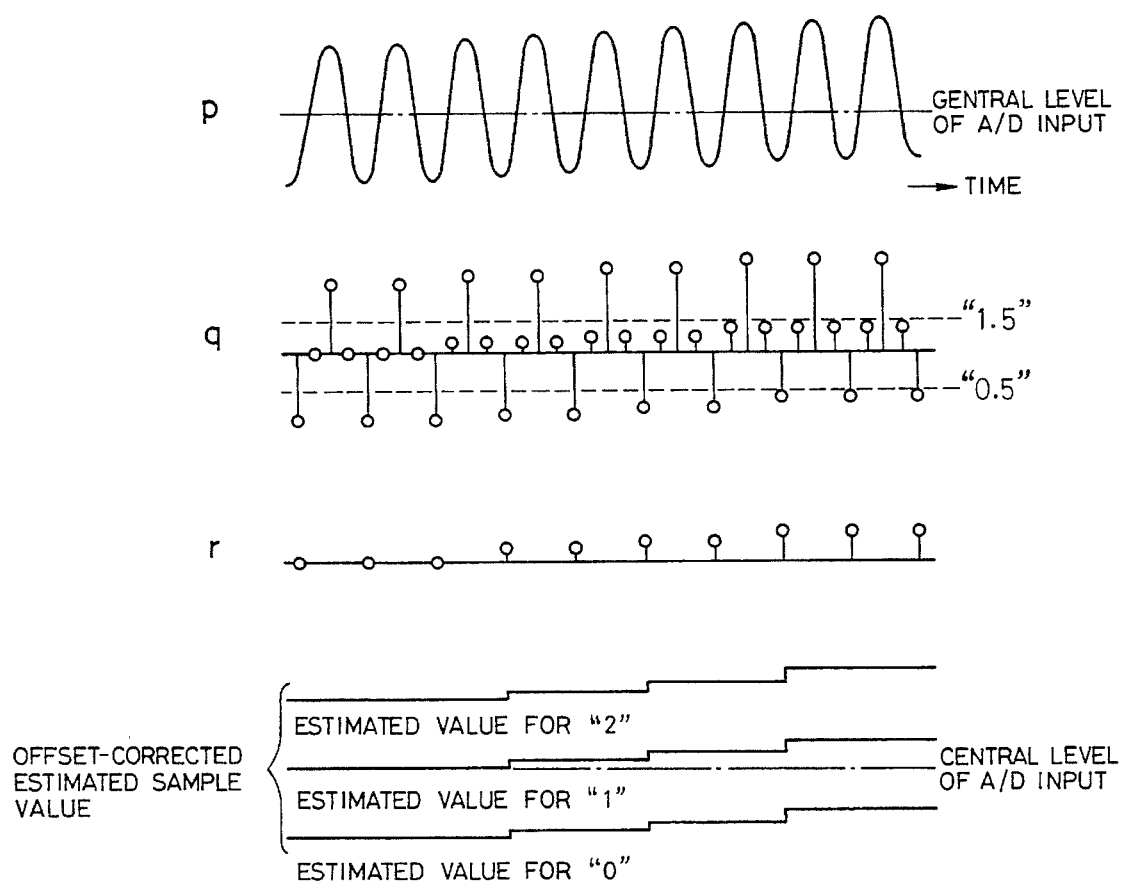
FIG. 13 is a diagram showing an operating waveform generated by the digital signal reproducing apparatus according to the second feature of the present invention.

Next description is made for an example of operations in this configuration with reference to FIG. 13.

At first, as values probable in an ideal sample value series "q" obtained by the A/D convertor is three of {0, 1, 2}, so that each of the values is stored as an estimated sample value in the estimated value memory 30. Herein, if an offset fluctuating in association with passage of time is generated in a read signal "p", samples in the sample value series "q" obtained by the A/D convertor 10 are uniformly shifted by a value corresponding to the offset. In this step, the sample value extracting circuit 13 extracts only values in a range from 0.5 to 1.5 from the sample value series "q" obtained by the A/D convertor 10, and supplies the sample values as offset sample values "s" to the offset level detecting circuit 15. The offset level detecting circuit 15 obtains an average value of the offset sample values "s" as an offset and supplies an offset signal "r" corresponding to this offset level to the addition circuit 24. Thus, offset-corrected estimated sample values obtained by uniformly adding a value corresponding to the offset signal "r" to each of the three estimated sample values {0,1,2} are outputted from the addition circuit 24 as shown in FIG. 13.

A branch-metric computing circuit 21 in the Viterbi decoder 20 supplies a square error between the offset-corrected estimated sample value supplied from the addition circuit 24 and the sample value series "q", namely {[sample value series "q"]—[offset-corrected estimated sample value] }$^2$ as a branch-metric signal to a path-metric computing circuit 22.

In this step, assuming that the offset level is R, a branch-metric signal generated in the branch-metric computing circuit 21 in the Viterbi decoder 20 can be expressed by the following expression:

{[sample value series "q"]—[R+estimated sample value] }$^2$ (1)

On the other hand, in the configuration as shown in FIG. 5, as values obtained by subtracting this offset level R from the sample value series "q" are supplied to the Viterbi decoder, a branch-metric signal generated by the branch-metric computing circuit 21 can be expressed by the following expression;

{[sample value series "q"- R]—[estimated sample value] }$^2$ (2)

From the two expressions above, it is possible to confirm that the same branch-metric signal is supplied to the path-metric computing circuit 22.

For this reason, like in the configuration as shown in FIG. 5, it is possible to execute Viterbi decoding removing an offset element in the sample value series "q".

It should be noted that, although in the configuration shown in FIG. 12 an offset-corrected estimated sample value obtained by adding a value corresponding to an offset level is obtained by the addition circuit 24, the present invention is not limited to the configuration. For instance, it is allowable to prepare values obtained by adding a probable offset value to each estimated sample value as offset-corrected estimated sample values and store the offset-corrected estimated sample values in an estimated value memory.

Figure 14:
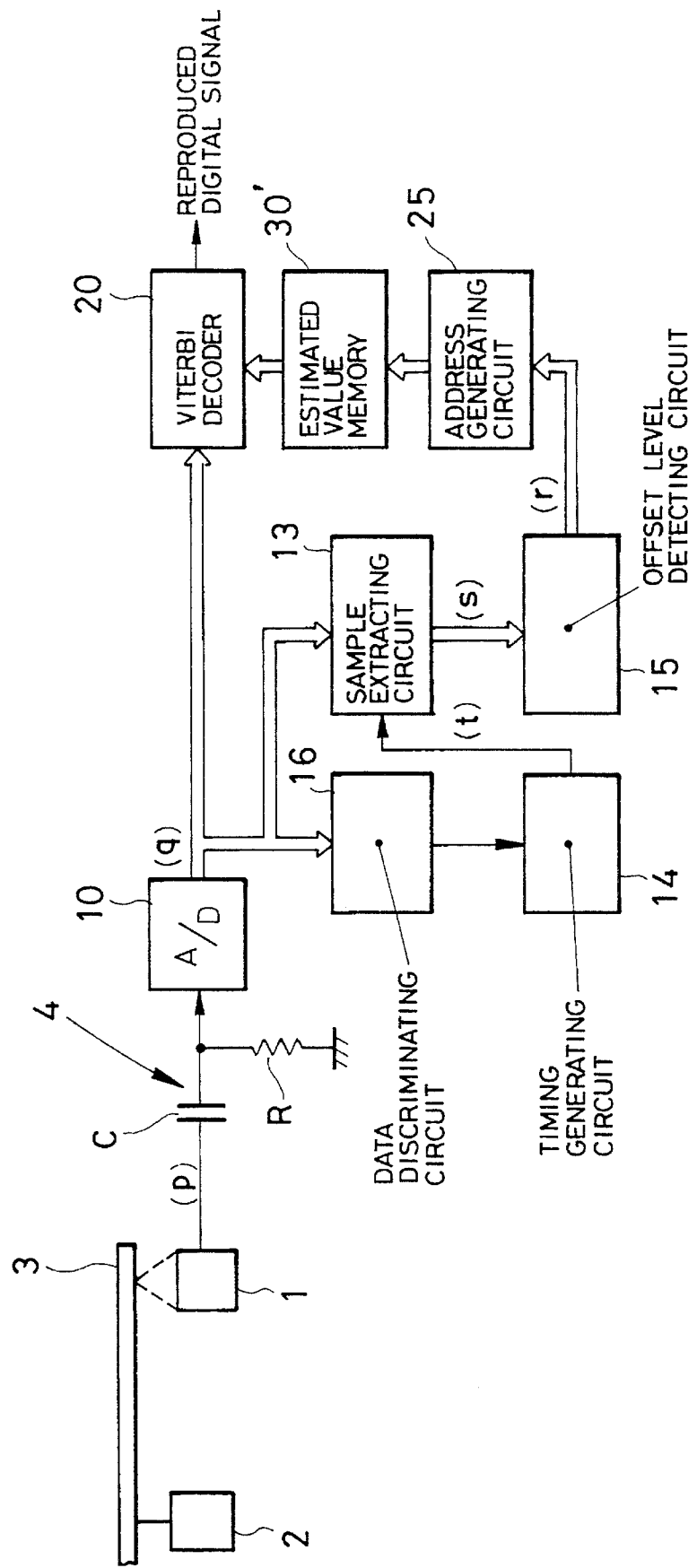
FIG. 14 is a diagram showing the configuration of a digital signal reproducing apparatus in another embodiment according to the second feature of the present invention.

FIG. 14 shows configuration of a digital signal reproducing apparatus according to other embodiment of the second feature of the present invention made in the light of the circumstances as described above.

It should be noted that the same reference numbers are assigned to the same modules as those shown in FIG. 12.

In this figure, an address generating circuit 25 supplies an address signal corresponding to an offset signal "r" supplied from the offset level detecting circuit 15 to the estimated value memory 30'. The estimated value memory 30' reads each of offset-corrected estimated sample values each corresponding to an address signal supplied thereto from contents of storage and supplied the values to the Viterbi decoder 20.

FIG. 15 is a view illustrating an example of a memory map in the estimated value memory 30'.

For instance, if any offset is not generated in a sample value series "q", the offset signal "r" is "0" (zero). In this step, the address generating circuit 25 supplies "3" as an address signal to the estimated value memory 30'. The estimated value memory 30' supplies each of "0", "1", "2", each of which is contents of storage, as an offset-corrected sample value to the branch-metric computing circuit 21. If an offset of "–0.2" is generated in the sample value series "q", the offset signal "r" becomes "–0.2" according to the offset level. In this step, the address generating circuit 25 supplies "1" as an address signal to the estimated value memory 30'. The estimated value memory 30' supplies each of "–0.2", "0.81", and "1.8", which is contents of memory, as an offset-corrected estimated sample value according to the address signal to the branch-metric computing circuit 21. If an offset of "+0.2" is generated in the sample value series "q", the offset signal "r" becomes "0.2" according to the offset level. In this step, the address generating circuit 25 supplies "5" as an address signal to the estimated value memory 30'. The estimated value memory 30' supplies each of "0.2", "1.2", "2.2", which is contents of the memory, according to the address signal as an offset-corrected estimated sample value to the branch-metric computing circuit 21.

In the embodiments shown in FIGS. 10 and 12, a circuit construction is adopted in which the sample extracting means which comprises the data discriminating circuit 16 and the sample value extracting circuit 13 is operative to extract, from the sample value series "q", sample values whose value is within a range (0.5 through 1.5) near to the zero-crossing, and the extracted sample values are supplied to the offset level detecting circuit 15 as offset sample values "s".

However, when the recording information is recorded on the optical disk 3 at high density, there can be a case where the center level of the read signal "p" obtained by reading pits having long run-lengths does not coincide with the center level of the read signal "p" obtained by reading pits having short run-lengths. Hence, if all of the sample values whose value is within the range around the zero-crossing are extracted and used as the offset sample values "s", the accuracy in detection of the offset cannot be maintained.

Figure 16:
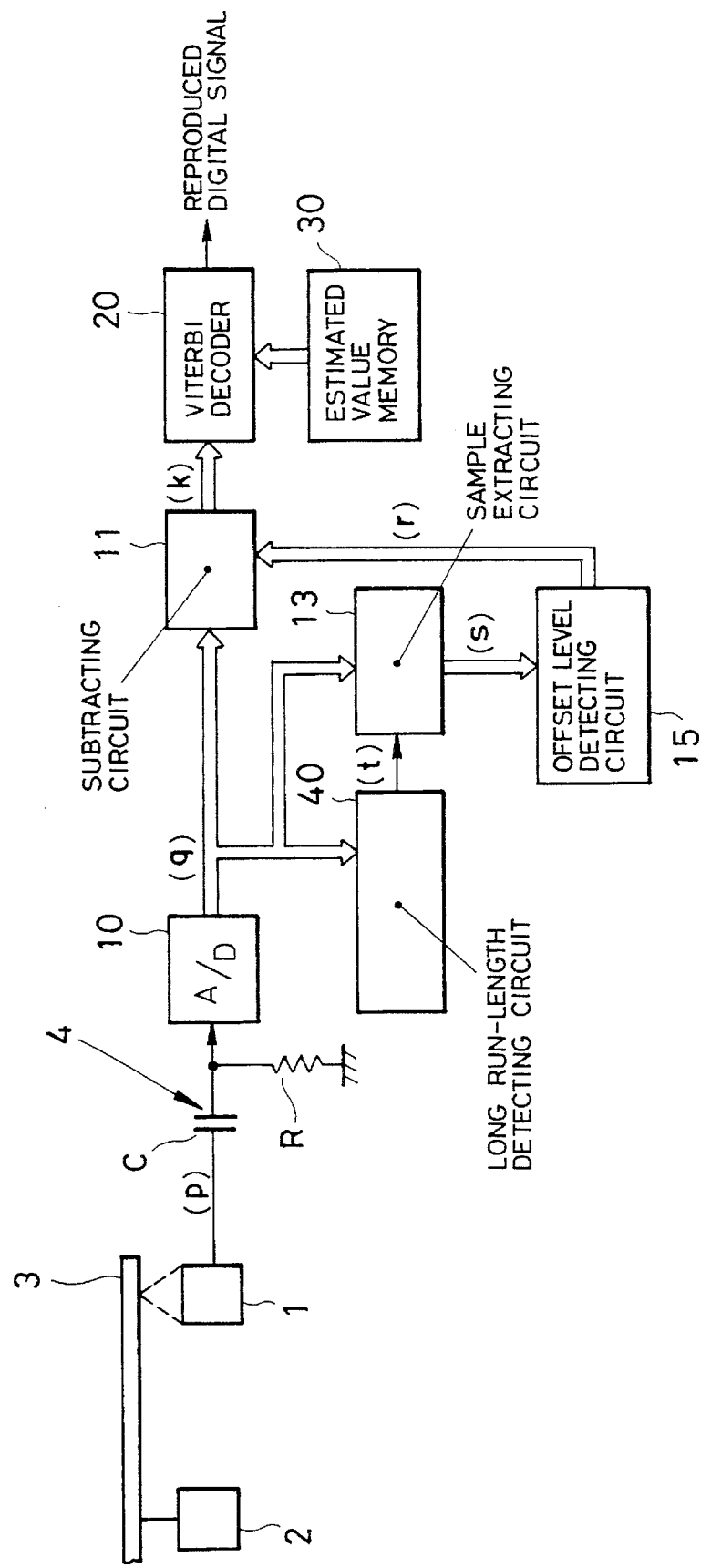
FIG. 16 is a diagram showing the configuration of another embodiment of the digital signal reproducing apparatus according to the first feature of the present invention.
Figure 17:
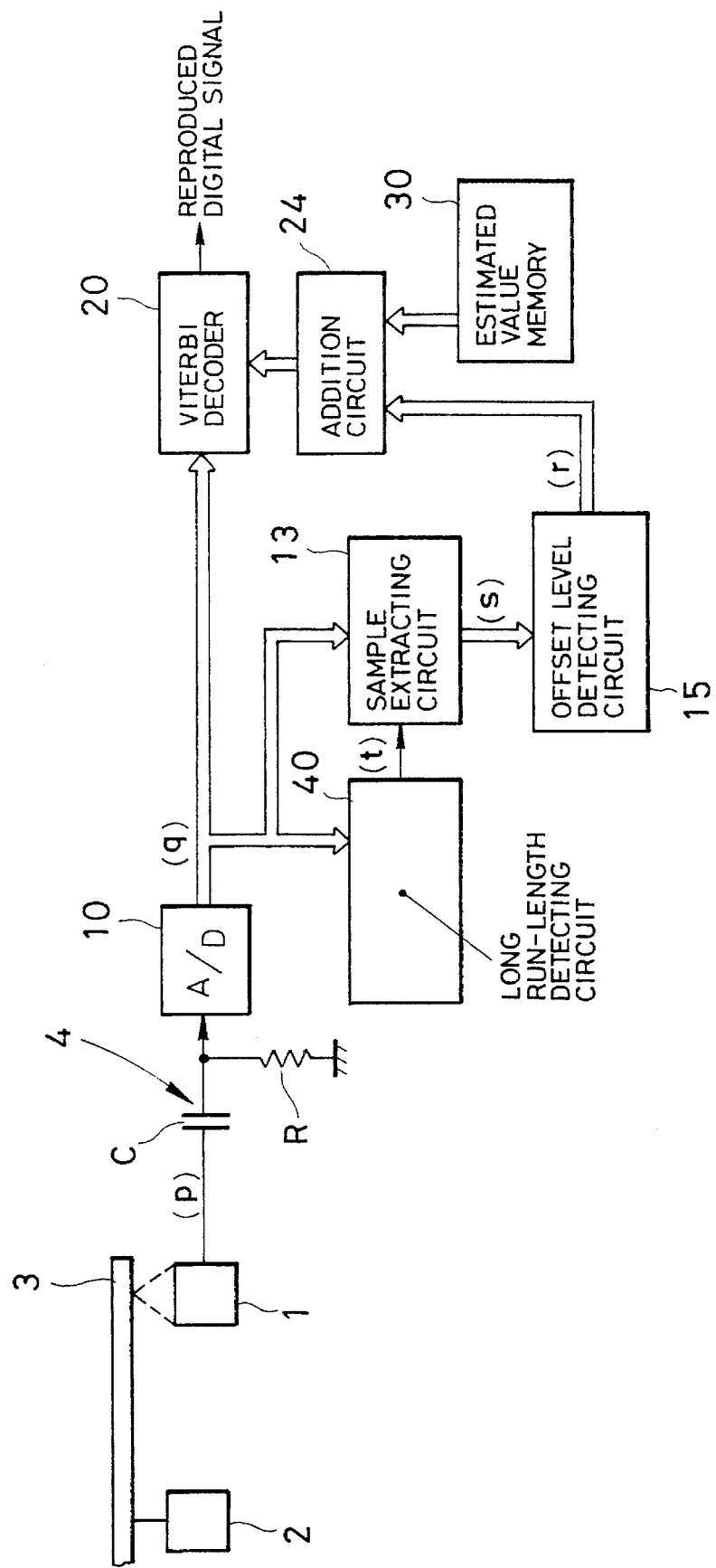
FIG. 17 is a diagram showing the configuration of another embodiment of the digital signal reproducing apparatus according to the second feature of the present invention.

FIGS. 16 and 17 are diagrams showing other embodiments of the digital signal reproducing apparatus which are devised in consideration of the above-described problem.

The circuit configuration shown in FIGS. 16 and 17 are produced by improving the structure shown in FIGS. 10 and 12, in which functional blocks corresponding to those shown in FIGS. 10 and 12 are denoted by the same reference numerals.

In FIGS. 16 and 17, a long run-length detecting circuit 40 is used instead of the data discriminating circuit 16 and timing generating circuit 14. The long run-length detecting circuit 40 is configured to detect a period in which A/D converter 10 produces sample values which are obtained by reading recording pits having run-lengths longer than a predetermined length and whose values are within the range around the zero-crossing, and to supply a timing signal "t" corresponding to the detection timing of those sample values, to the sample value extracting circuit 13.

As described above, in the embodiment shown in FIGS. 16 and 17, the sample value extracting means is comprised of the long run-length detecting circuit 40 and the sample value extracting circuit 13, and sample values obtained by reading recording pits having run-lengths longer than a predetermined length and whose values are within the range around the zero-crossing are extracted from the sample value series "q" by the sample value extracting means, and the extracted sample values are supplied to the offset level detecting circuit 15 as the offset sample values "s".

By this circuit configuration, the detection of the offset is performed accurately even when the recording information is recorded on the optical disk at high density.

Figure 18:
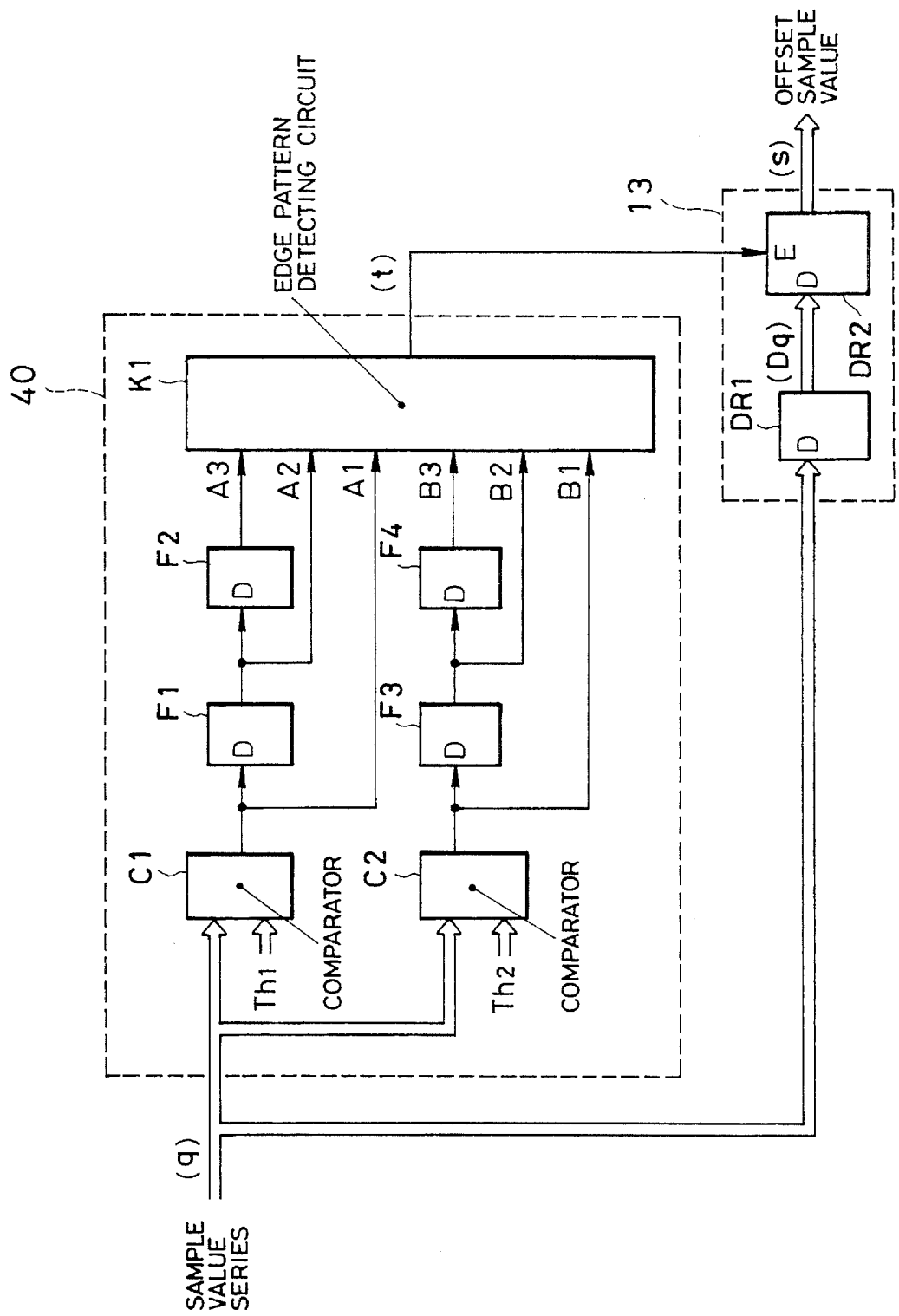
FIG. 18 is a diagram showing the construction of a long run-length detecting circuit 40 and a sample value extracting circuit 13.

FIG. 18 shows an example of the structure of the long run-length detecting circuit 40 and the sample value extracting circuit 13.

In the embodiment shown in FIG. 18, an example of the circuit adopted for detecting the offset level by using the sample values obtained by reading recording pits of run-lengths equal to or longer than 3T, when recording pits having run-lengths ranging between 2T through 8T are formed on the optical disk 3.

In FIG. 18, a comparator C1 supplies a signal A1 having a logical value "1" to a D flip-flop F1 and an edge pattern detecting circuit K1 when values of the sample value series "q" obtained at the A/D converter 10 are larger than a first threshold $Th_1$. When, on the other hand, the values of the sample value series "q" are smaller than the first threshold $Th_1$, the comparator C1 supplies the signal A1 having a logical value "0" to the D flip-flop F1 and edge pattern detecting circuit K1. The first threshold $Th_1$ mentioned above is set at a value higher than an average center level of the sample value series "q". The D flip-flop F1 takes in the supplied signal A1 consecutively at timings the same as the predetermined sampling timing at the A/D converter 10, and supplies it to a D flip-flop F2 and the edge pattern detecting circuit K1, as a signal A2. The D flip-flog F2, on the other hand, takes in the supplied signal A2 consecutively at timings the same as the predetermined sampling timing at the A/D converter 10, and supplies it to the edge pattern detecting circuit K1 as a signal A3. Furthermore, a comparator C2 supplies a signal B1 having a logical value "1" to a D flip-flop F3 and the edge pattern detecting circuit K1 when values of the sample value series "q" obtained at the A/D converter 10 are larger than a second threshold $Th_2$. When, on the other hand, the values of the sample value series "q" are smaller than the first threshold $Th_1$, the comparator C1 supplies the signal B1 having a logical value "0" to the D flip-flop F3 and edge pattern detecting circuit K1. The second threshold $Th_2$ mentioned above is set at a value lower than the above-mentioned average center level. The D flip-flop F3 takes in the supplied signal B1 consecutively at timings the same as the predetermined sampling timing at the A/D converter 10, and supplies it to a D flip-flop F4 and the edge pattern detecting circuit K1, as a signal B2. The D flip-flog F4, on the other hand, takes in the supplied signal B2 consecutively at timings the same as the predetermined sampling timing at the A/D converter 10, and supplies it to the edge pattern detecting circuit K1 as a signal B3.

Figures 19, 20:
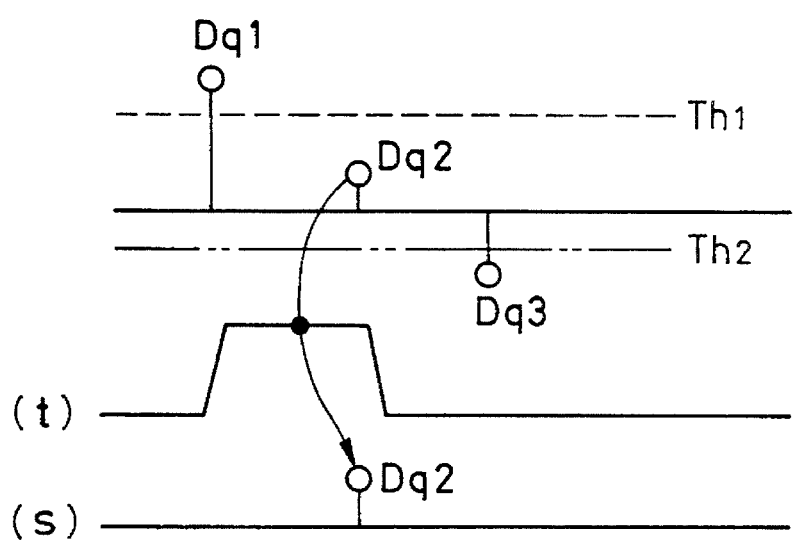
FIG. 19 is a diagram showing the operation of an edge pattern detecting circuit K1.
FIG. 20 is a diagram showing operating waveforms of the long run-length detecting circuit 40 and sample value detecting circuit 13.

The edge pattern detecting circuit K1 generates a timing signal "t" when the signals A1 through A3, B1 through B3 assume a state of signal logic values shown in FIG. 19, and supplies it to the sample value extracting circuit 13.

Briefly speaking, the edge pattern detecting circuit K1 is operative to detect a falling edge of the value of the sample value series "q" when it varies from a value larger than the first threshold $Th_1$ to a value smaller than the second threshold $Th_2$ and a rising edge of the value of the sample value series "q" when it varies from a value smaller than the above-mentioned second threshold $Th_2$ to a value larger than the first threshold $Th_1$, and generates the timing signal "t" when those edges are detected.

The sample value extracting circuit 13 is comprised of D-registers DR1 and DR2 each having a plurality of D flip-flops connected in parallel to each other. The D-register DR1 takes in the sample value series "q" consecutively at timings the same as the above-mentioned predetermined sampling timing, and supplies it to the D-register DR2 as a sample value series "Dq". The D-register DR2 takes in the sample value series "Dq" supplied from the D-register DR1 only when the timing signal "t" is supplied from the above-described long run-length detecting circuit 40, and outputs it as off-set sample values "s".

Figure 21:
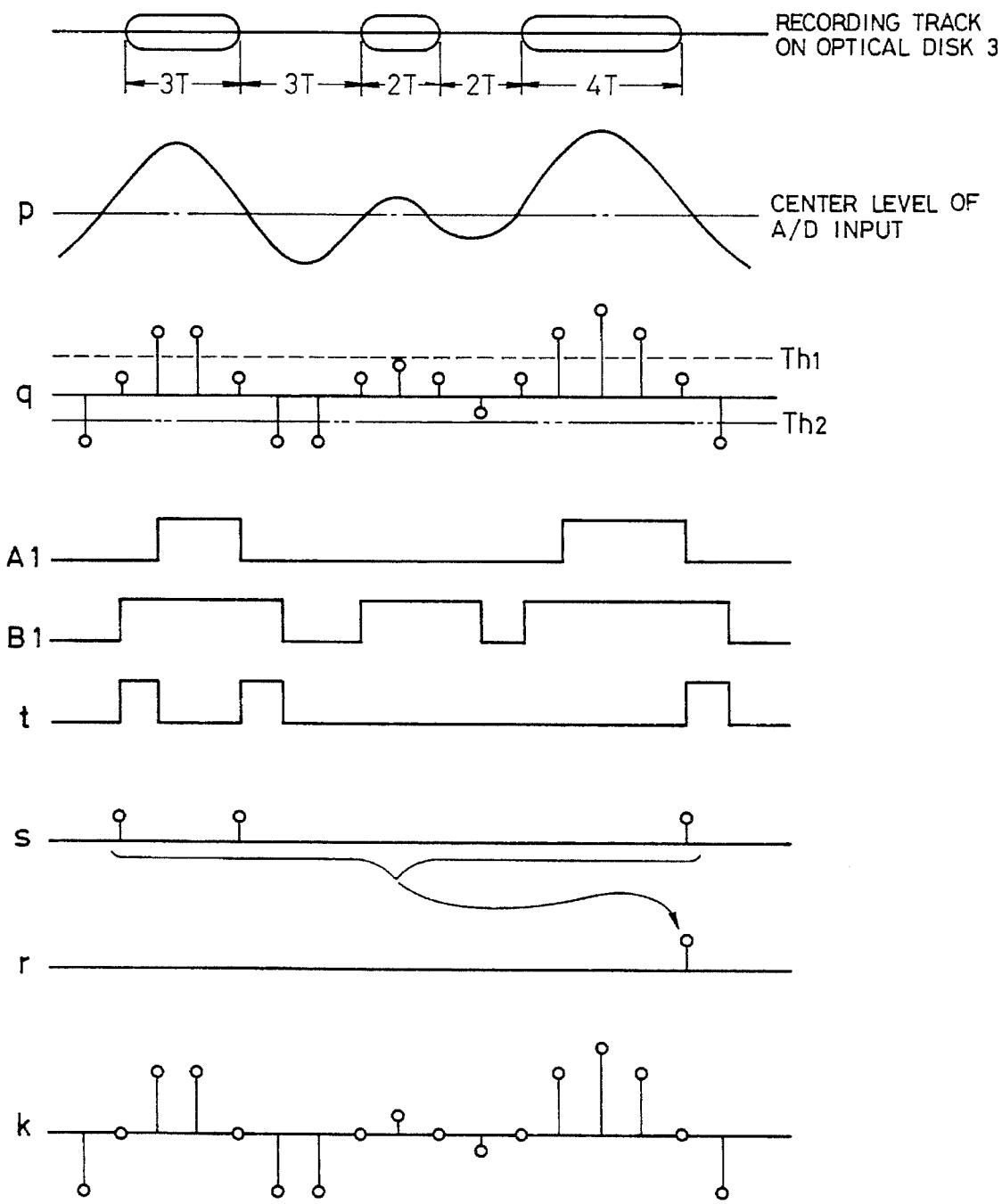
FIG. 21 is a diagram showing operating waveforms in another embodiment of the digital signal reproducing apparatus according to the present invention.
Figure 22:
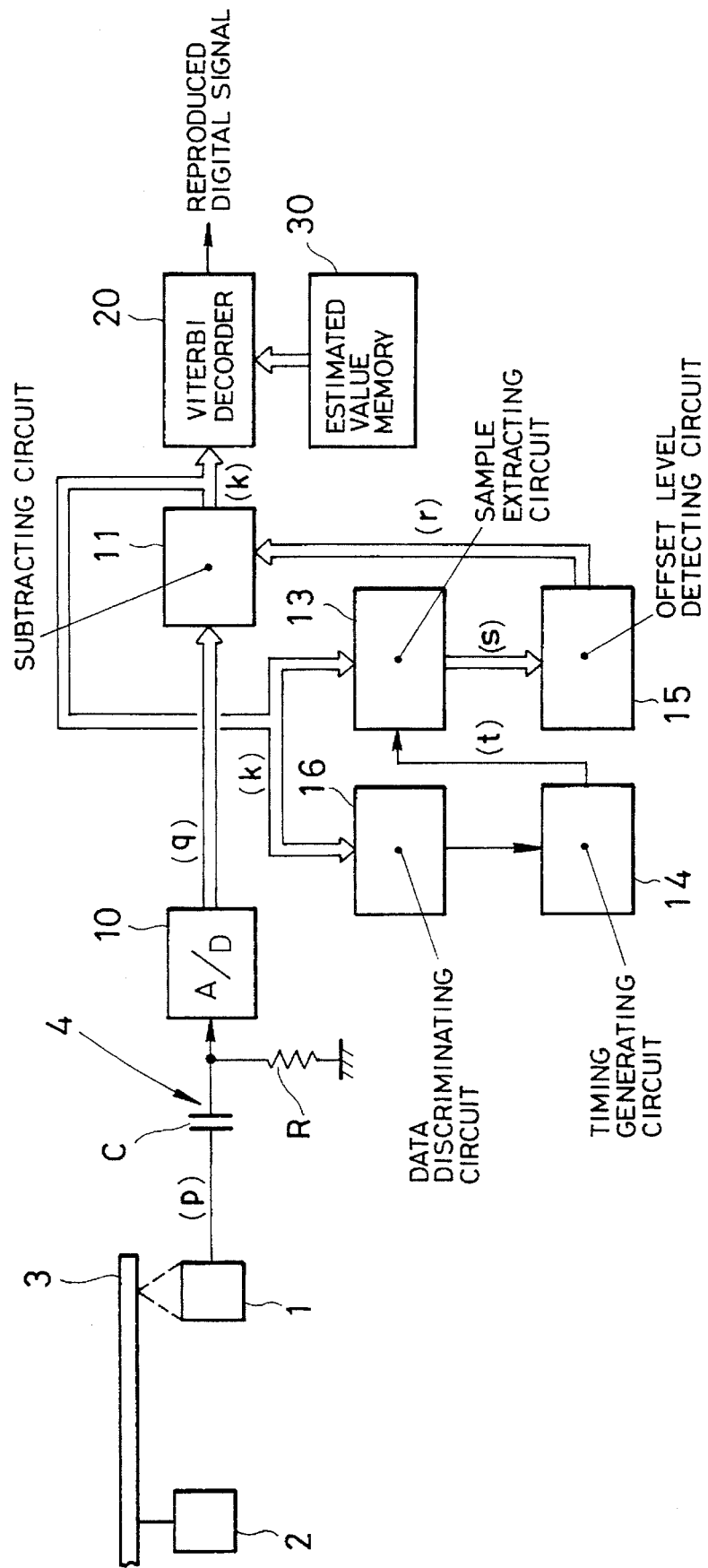
FIG. 22 is a diagram showing the configuration of a further embodiment of the digital signal reproducing apparatus according to the first feature of the present invention.

FIG. 21 is a diagram showing an example of operational waveforms obtained when the circuit structure shown in FIG. 18 is adopted as the long run-length detecting circuit 40 and the sample value extracting circuit 13 in the digital signal reproducing apparatuses depicted in FIGS. 16 and 17.

In FIG. 21, signals corresponding to those shown in FIGS. 16 through 18 are denoted by the same reference numerals. As shown in FIG. 21 when, among recording pits formed in the recording track on the optical disk 3 whose run-lengths are between 2T and 4T, recording pits of the run-length 2T are read out, the value of the sample value series "q" will become smaller than the first threshold $Th_1$ and larger than the second threshold $Th_2$ because of the response characteristic of the pick-up. In this state, the timing signal "t" will not be outputted from the edge pattern detecting circuit in the long run-length detecting circuit 40, as illustrated in FIG. 21. Therefore, by adopting the long run-length detecting circuit 40 and the sample value extracting circuit 13 that have the structure shown in FIG. 18, the control of the off-set level is performed by using sample values obtained by reading the recording pits having run-lengths equal to or longer than 3T.

As specifically described in the foregoing, the long run-length detecting circuit 40 shown in FIG. 18 is designed in view of the fact that the amplitude value of the read signal "p" obtained when reading the recording pits having the run-length of 2T becomes smaller than the amplitude value obtained when reading recording pits having run-lengths equal to or longer than 3T. The circuit 40 detects the run-lengths equal to or longer than 3T by detecting a condition that the progress of the level of the sample value series "q" has exceeded a predetermined range (between the first threshold $Th_1$ and the second threshold $Th_2$).

In the embodiment shown in FIG. 10, the sample value extracting means which comprises the data discriminating circuit 16 and the sample value extracting circuit 13 is designed to produce the offset sample values "s" by using the sample value series "q" supplied from the A/D converter 10. However, it is also possible to adopt a structure in which the offset-corrected sample value series "k" obtained by the subtracting circuit 11 are fed back to the above-mentioned sample value extracting means.

As described in the foregoing, the digital signal reproducing apparatus according to the first feature of the present invention subjects read signals read from a recording medium to A/D conversion to convert the signals to a digital sample value series, extracts specified sample values from the sample value series to detect an average of the sample values as an offset level, subtracts a value corresponding to this offset level uniformly from the sample values subjected to A/D conversion, and thus obtains corrected sample values with offset removed therefrom.

The digital signal reproducing apparatus according to the second feature of the present invention converts read signals read from a recording medium to a digital sample value series by means of A/D conversion, extracts specified sample values from the sample value series, obtains an average of the specified sample value as an offset level, and executes Viterbi decoding to the sample value series according to the corrected estimated sample values obtained by uniformly adding a value corresponding to this offset level to each of the sample values in the Viterbi decoder.

For the reasons as described above, even if an offset is generated in a read signal in a case where a DC component is included in recorded data, or where the optical characteristics such as a reflection index or a refractor factor has changes, it is possible with the present invention to execute Viterbi decoding removing this offset element, so that a digital signal can be reproduced without the decoding performance in Viterbi decoding being deteriorated.

What is claimed is:

1. A digital signal reproducing apparatus for obtaining a reproduced digital signal by reproducing recorded information from a read signal read from a recording medium on which a digital signal is recorded, comprising:

An A/D convertor for successively sampling read signals and converting the signals to a digital sample value series;

a sample value extracting means for extracting specified sample values from the sample value series;

an offset detecting means for obtaining an average value of the sample values and generating an offset signal corresponding to said average value;

a subtracting means for obtaining a value obtained by subtracting a value corresponding to said offset signal from sample values in said sample value series as offset-corrected sample values; and a decoding means for obtaining a reproduced digital signal by executing decoding processing according to said offset-corrected sample values.

2. A digital signal reproducing apparatus according to claim 1, wherein said recording medium has a mirror surface section for detecting synchronism, and said sample value extracting means extracts sample values corresponding to said mirror surface section from said sample value series.

3. A digital signal reproducing apparatus according to claim 1, wherein said recording medium stores specified pattern signals recorded therein and said sample value extracting means extracts sample values each corresponding to each of said specified pattern signals from said sample value series.

4. A digital signal reproducing apparatus according to claim 1, wherein said recording medium stores information signals based on a partial response system recorded therein and said sample value extracting means extracts sample values each having a level in a specified range as said specified values from said sample value series.

5. A digital signal reproducing apparatus according to claim 1, wherein said decoding means is a Viterbi decoder.

6. A digital signal reproducing apparatus for obtaining a reproduced digital signal by reproducing recorded information from a read signal read from a recording medium on which a digital signal is recorded, comprising:

an A/D convertor for successively sampling read signals and converting the signals to a digital sample value series;

a sample value extracting means for extracting specified sample values from said digital sample value series;

an offset detecting means for obtaining an average value of the sample values and generating an offset signal corresponding to said average value;

an estimated value memory for storing therein a plurality of estimated sample values probable as sample values in said sample value series;

an adding means for uniformly adding a value corresponding to said offset signal to each of said estimated sample values and obtaining offset-corrected estimated sample values; and a decoding means for decoding as said reproduced digital signal a data string providing a minimal accumulative sum of square errors each between each sample value in said sample value series and said offset-corrected estimated sample value.

7. A digital signal reproducing apparatus according to claim 6, wherein said recording medium has a mirror surface section for detecting synchronism, and said sample value extracting means extracts sample values corresponding to said mirror surface section from said sample value series.

8. A digital signal reproducing apparatus according to claim 6, wherein said recording medium stores specified pattern signals recorded therein and said sample value extracting means extracts sample values each corresponding to each of said specified pattern signals from said sample value series.

9. A digital signal reproducing apparatus according to claim 6, wherein said recording medium stores information signals based on a partial response system recorded therein and said sample value extracting means extracts sample values each having a level in a specified range as said specified values from said sample value series.

10. A digital signal reproducing apparatus according to claim 6, wherein said decoding means is a Viterbi decoder.

* * * * *